W. THOMSON.
Electric-Telegraph Apparatus.
No. 156,897. Patented Nov. 17, 1874.
22 Sheets--Sheet 1.
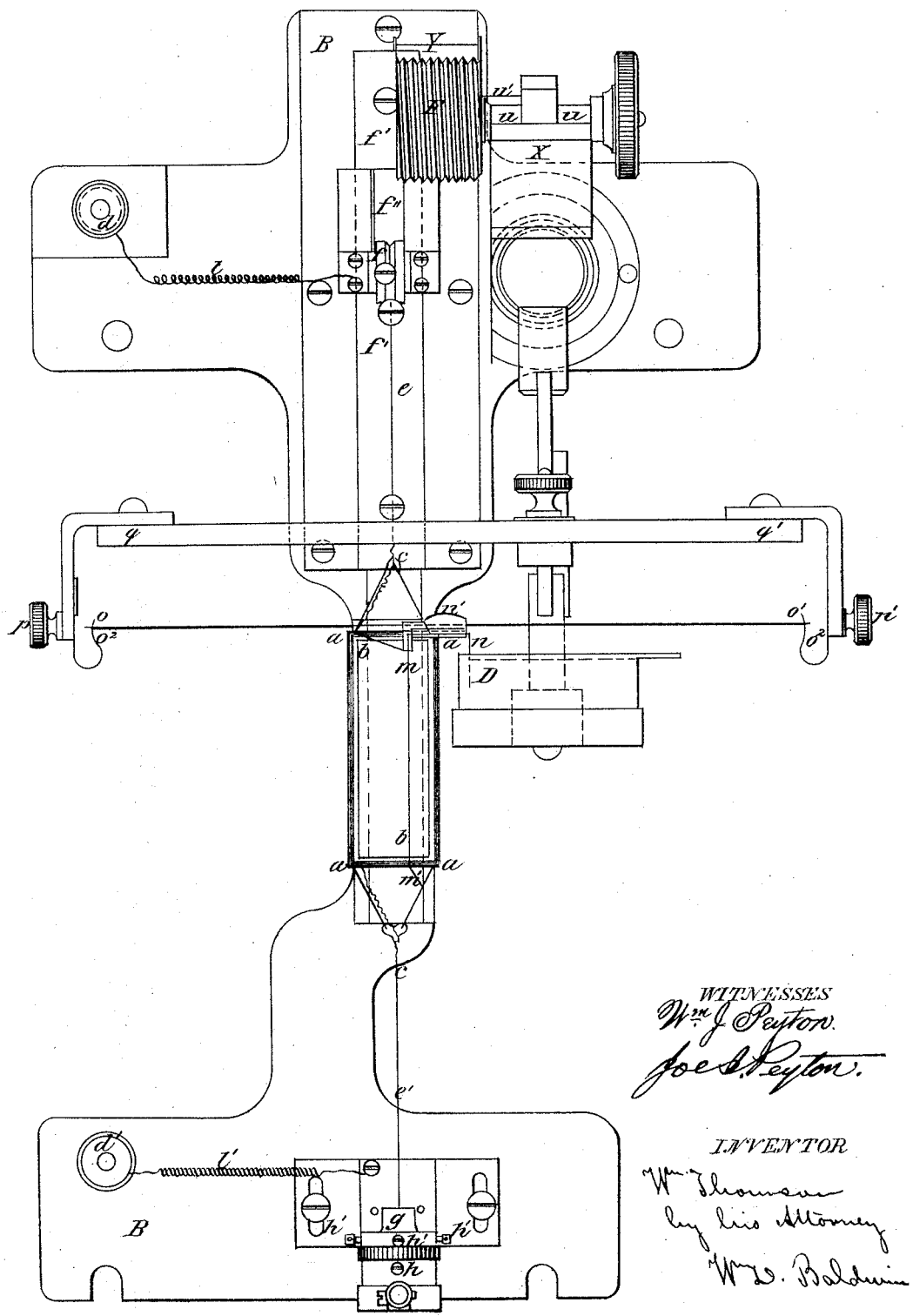
Fig. 1 (Sheet 1)
WITNESSES
Wm. J. Peyton.
Joe S. Peyton.
INVENTOR
Wm. Thomson
by his Attorney
Wm. D. Baldwin

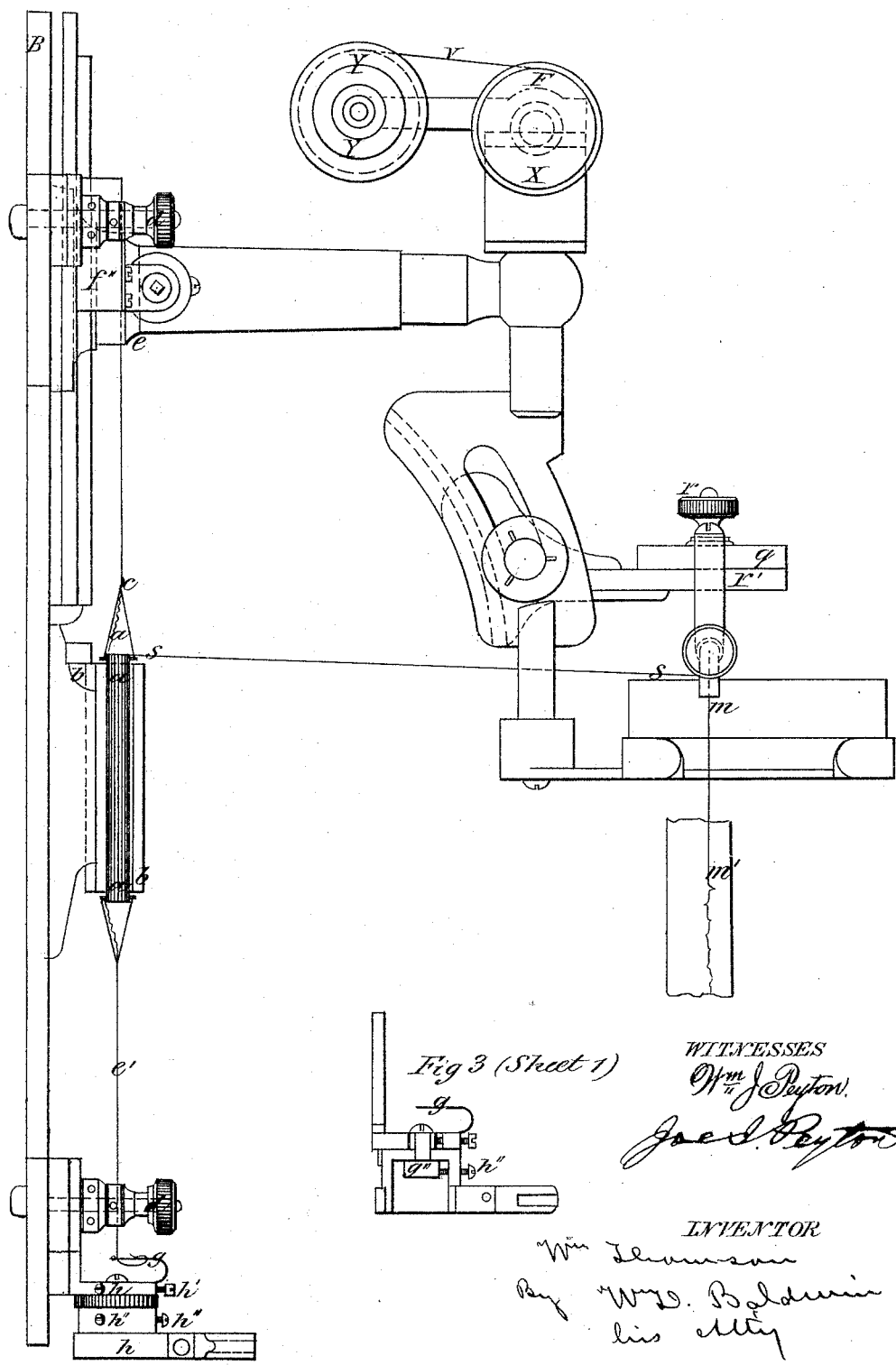

22 Sheets--Sheet 3.
W. THOMSON.
Electric-Telegraph Apparatus.
No. 156,897. Patented Nov. 17, 1874.
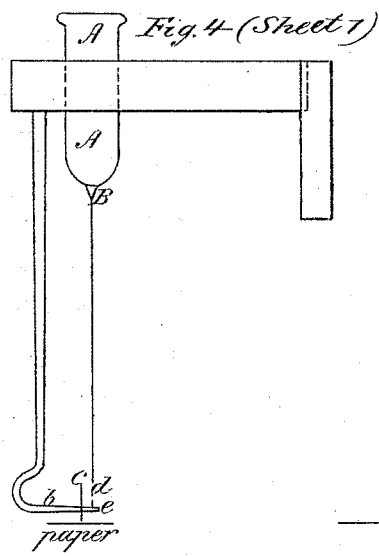
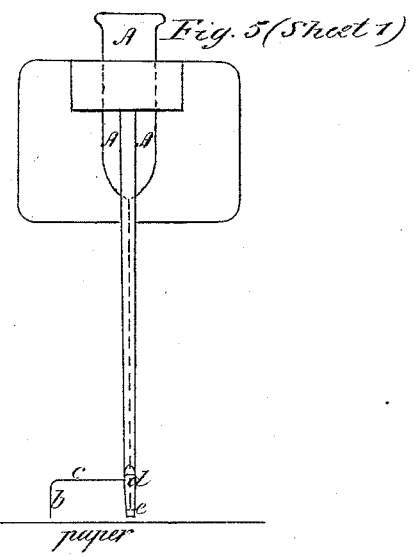
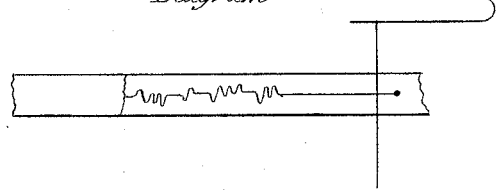
WITNESSES
INVENTOR 22 Sheets--Sheet 4.
W. THOMSON.
Electric-Telegraph Apparatus.
No. 156,897. Patented Nov. 17, 1874.
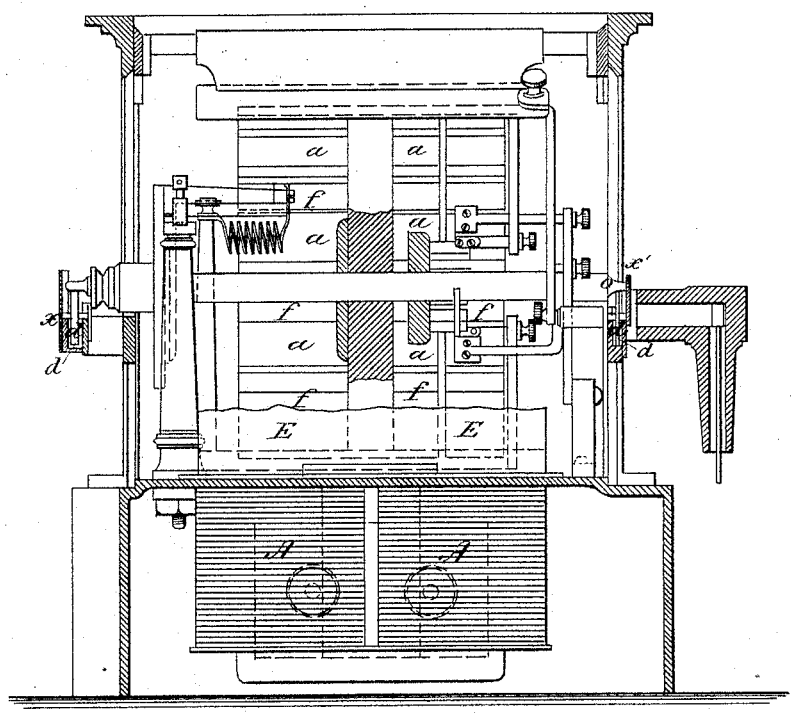
Fig 6 (Sheet 1)

22 Sheets--Sheet 5.
W. THOMSON.
Electric-Telegraph Apparatus.
No. 156,897.          Patented Nov. 17, 1874.
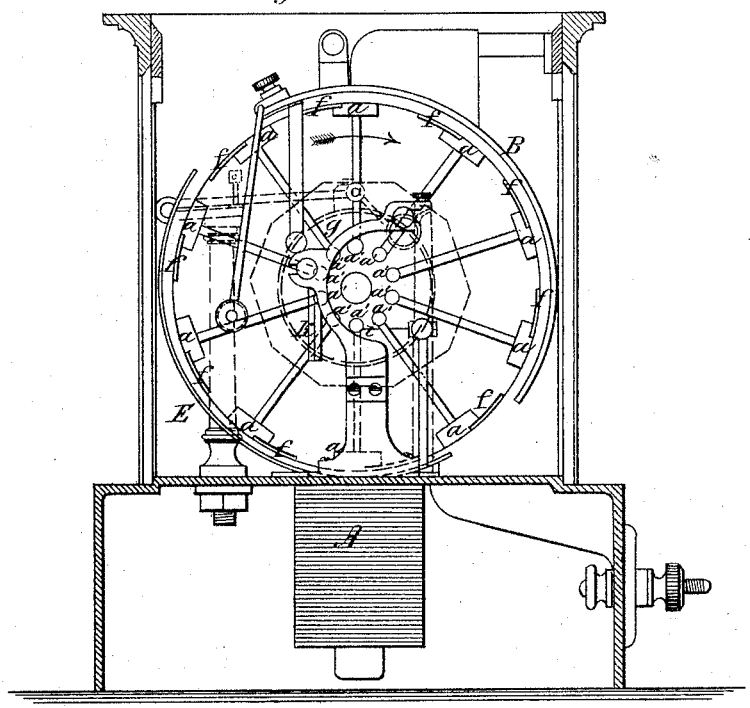
Fig. 7 (Sheet 1)
WITNESSES          INVENTOR 22 Sheets--Sheet 6.
W. THOMSON.
Electric-Telegraph Apparatus.
No. 156,897. Patented Nov. 17, 1874.
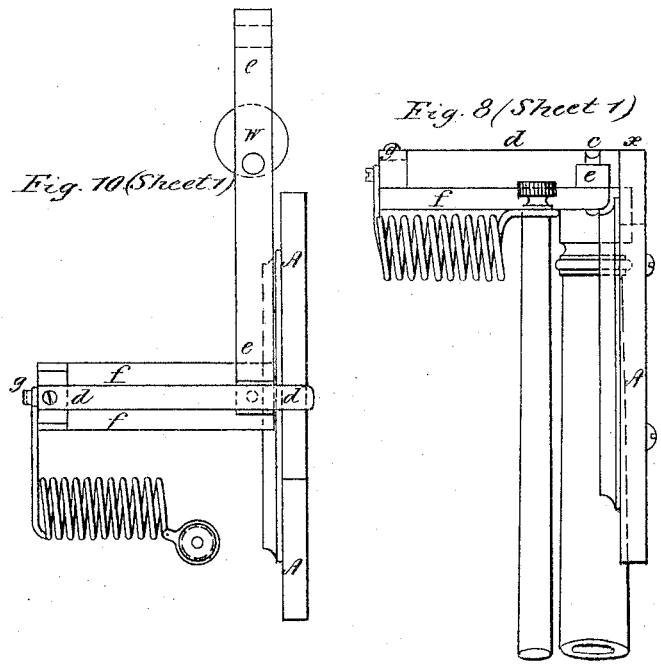
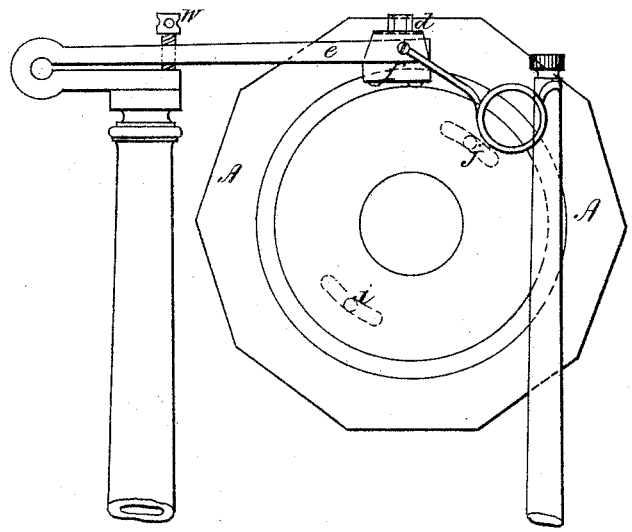
WITNESSES
INVENTOR
By
Attorney 22 Sheets--Sheet 7.
W. THOMSON.
Electric-Telegraph Apparatus.
No.156,897.  Patented Nov. 17, 1874.
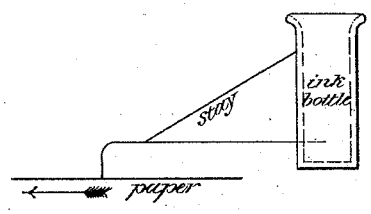
Fig. 11 (Sheet 1)
Diagram
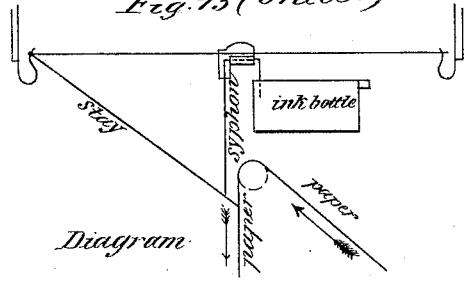
Fig. 13 (Sheet 1)
Diagram
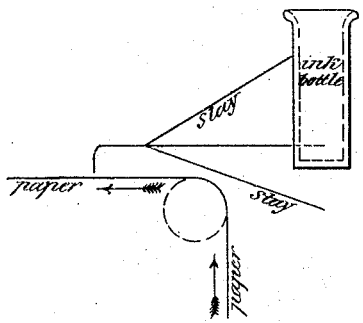
Fig. 12 (Sheet 1)
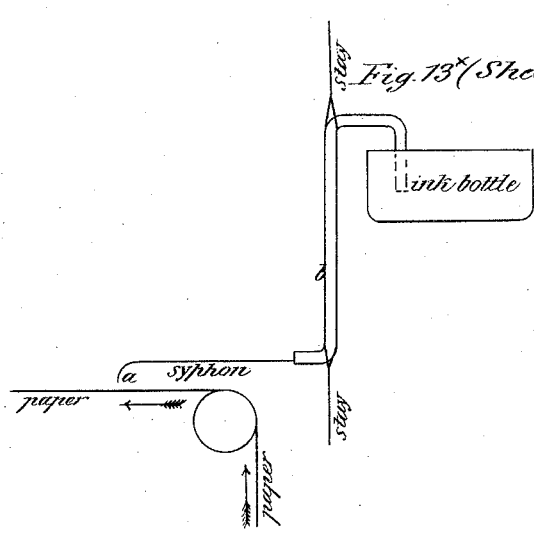
Fig. 13ˣ (Sheet 1)
WITNESSES
Wm J. Peyton.
Joel Peyton.
INVENTOR.
Wm Thomson
By Wm D. Baldwin, his Attorney 22 Sheets--Sheet 8.
W. THOMSON.
Electric-Telegraph Apparatus.
No. 156,897. Patented Nov. 17, 1874.
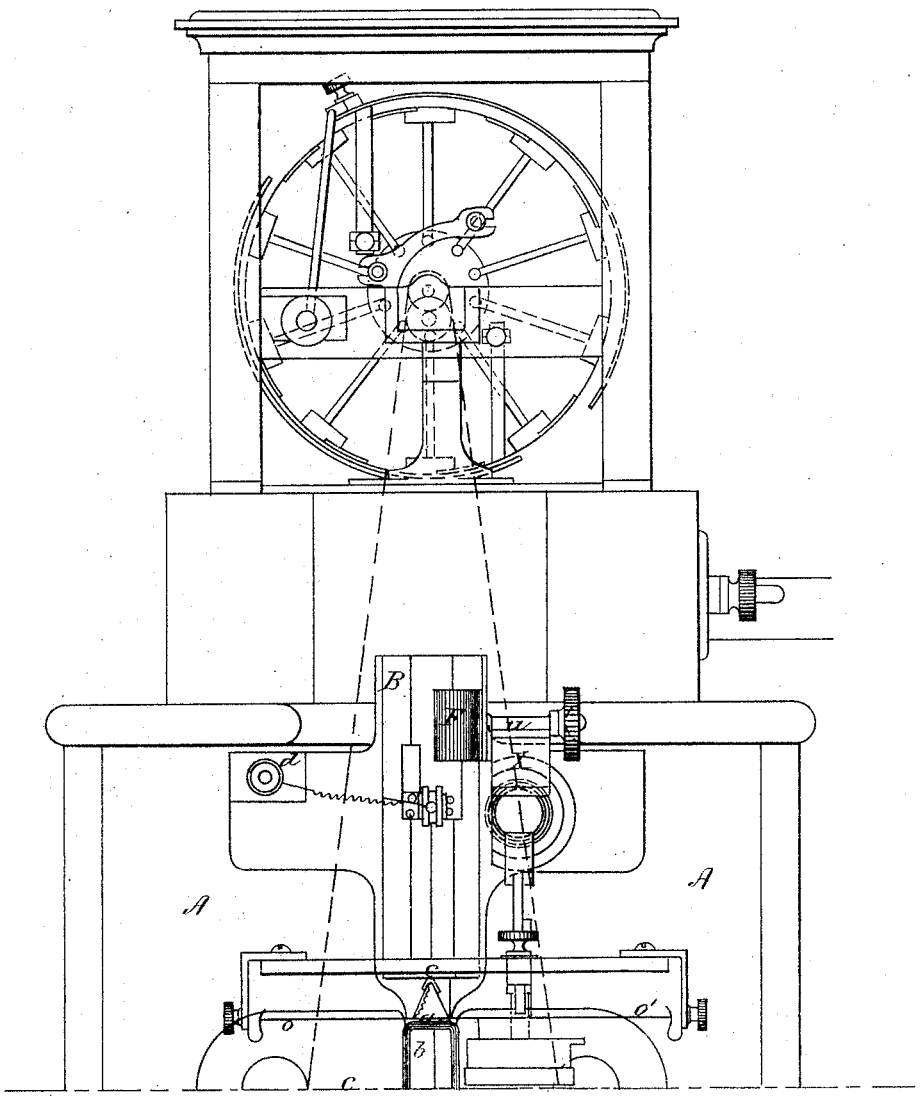
Fig 1 (Sheet 2)
WITNESSES
Wm J. Peyton.
Joc. S. Peyton.
INVENTOR
Wm. Thomson
By
W. D. Baldwin, his Attorney

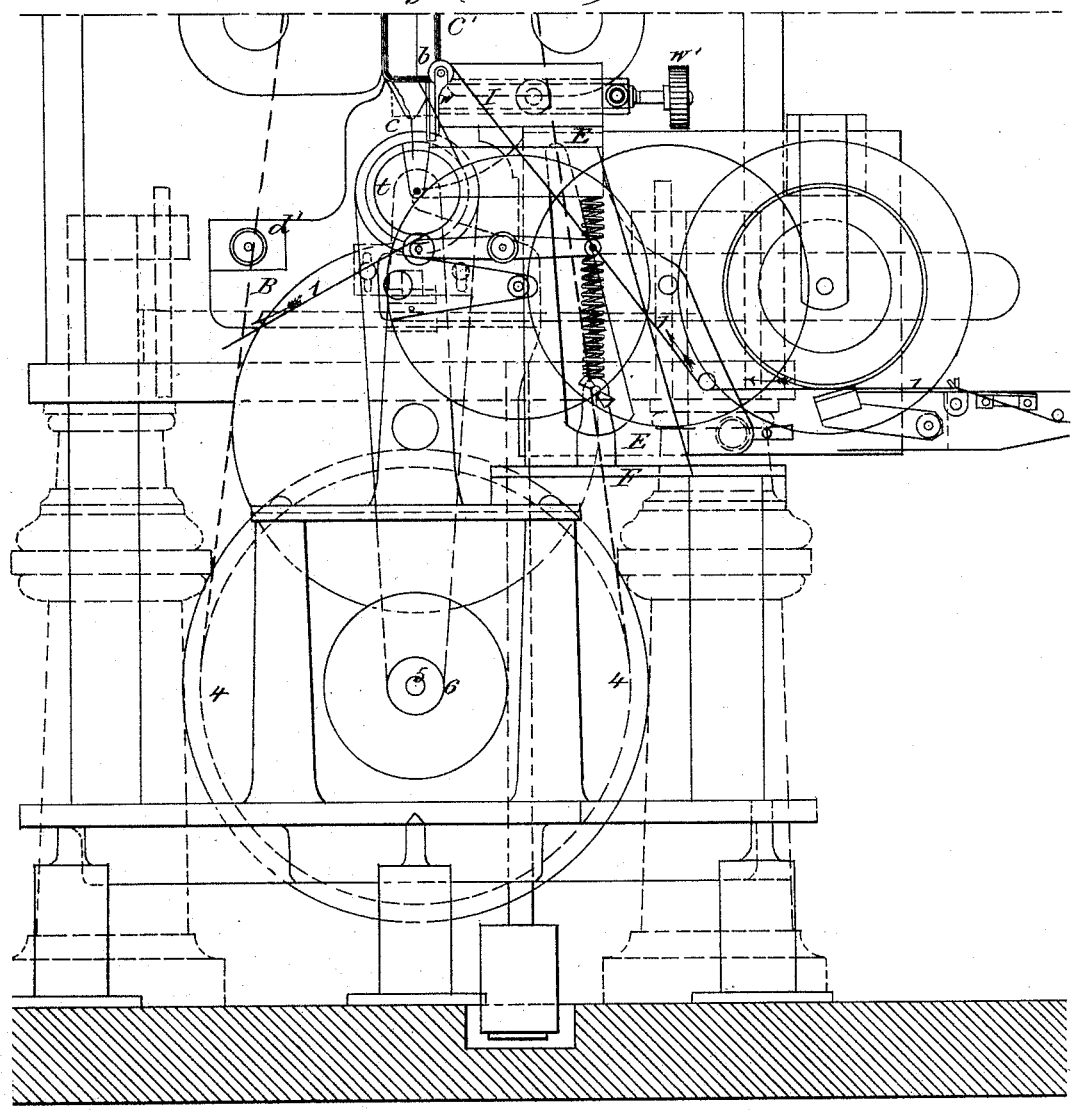

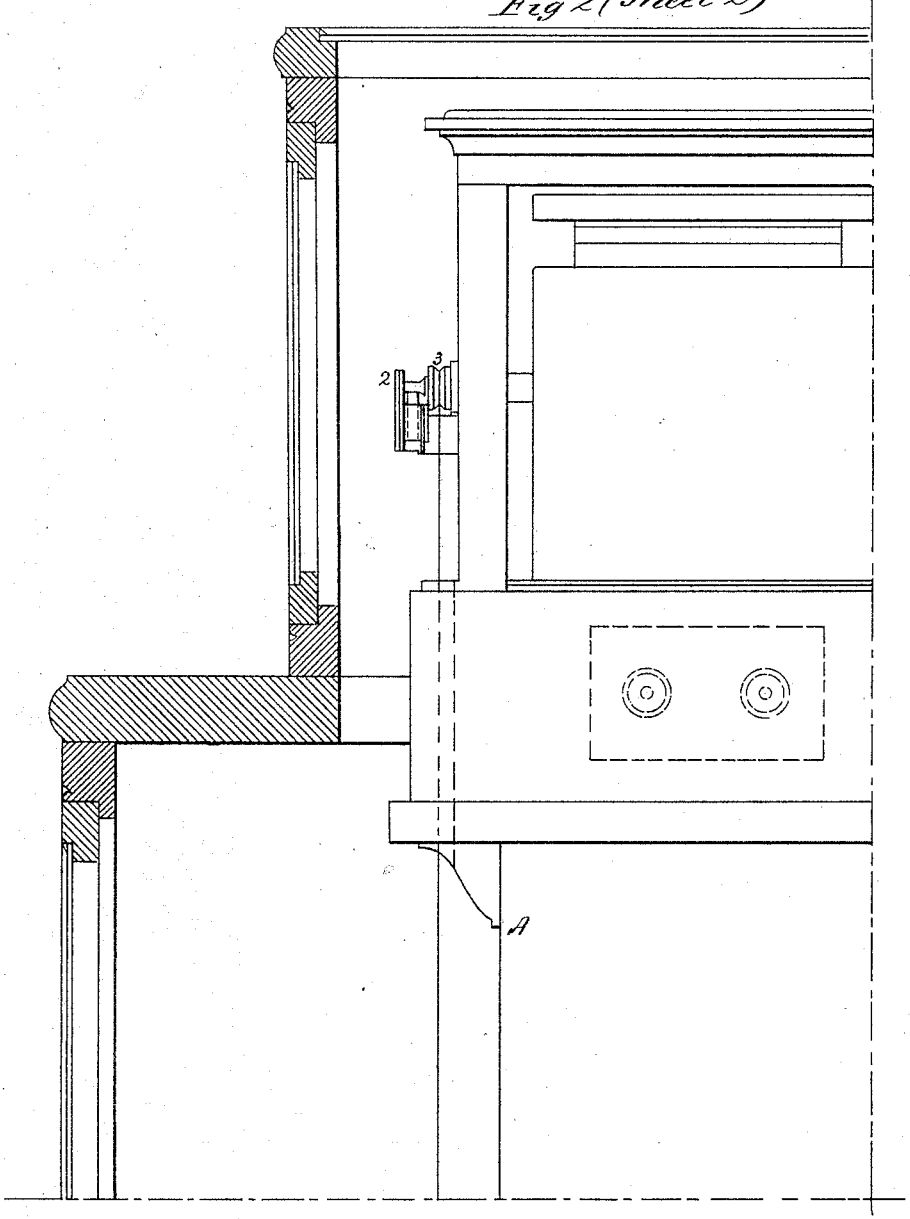

W. THOMSON.
Electric-Telegraph Apparatus.
No. 156,897.  Patented Nov. 17, 1874.
22 Sheets--Sheet 11.
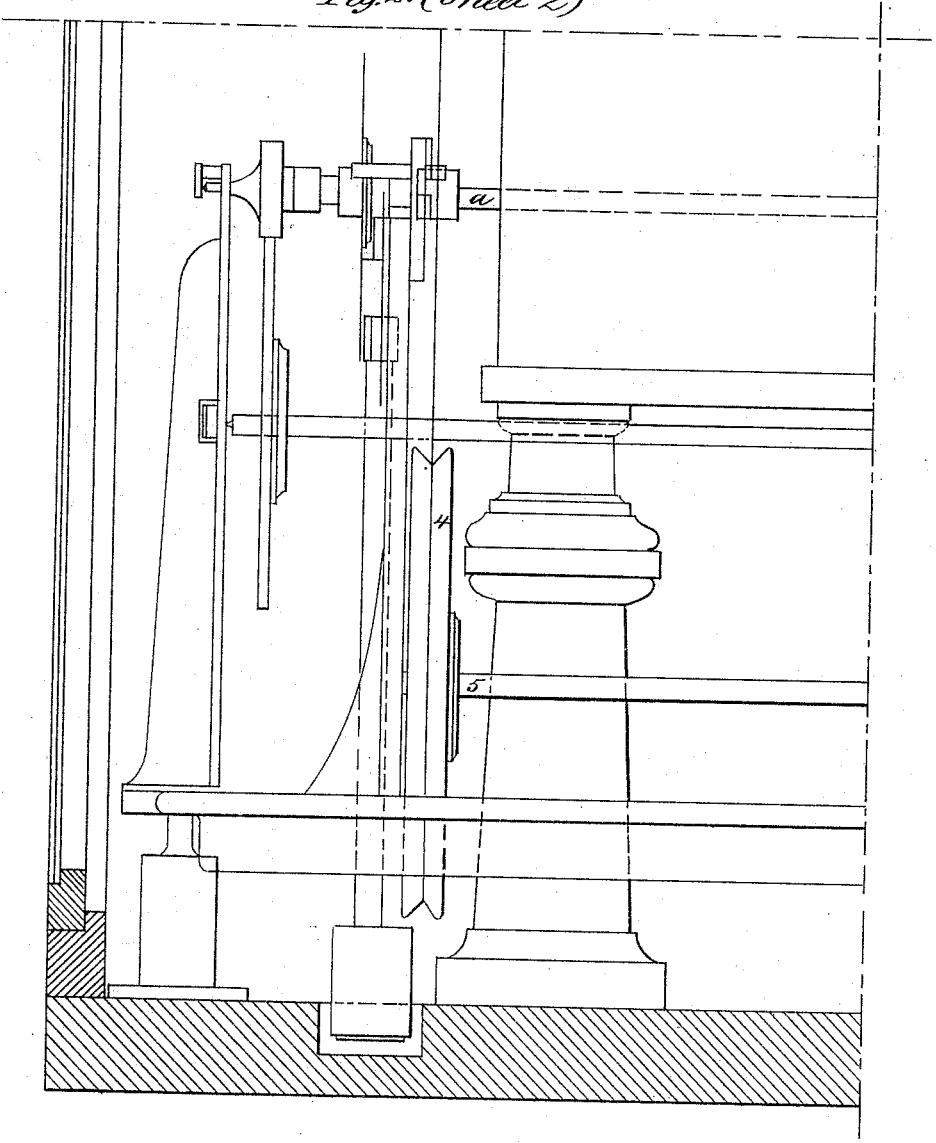
Fig. 2. (Sheet 2)

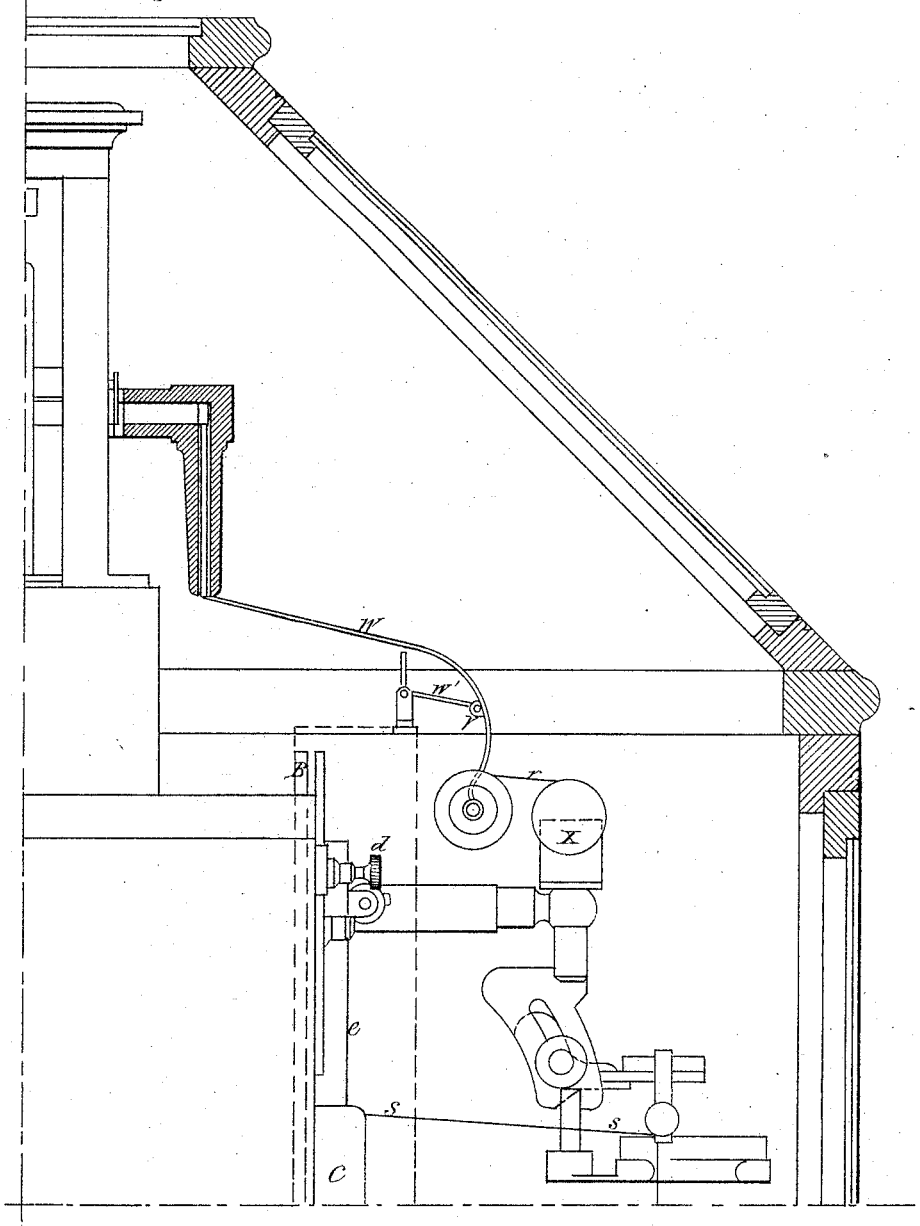

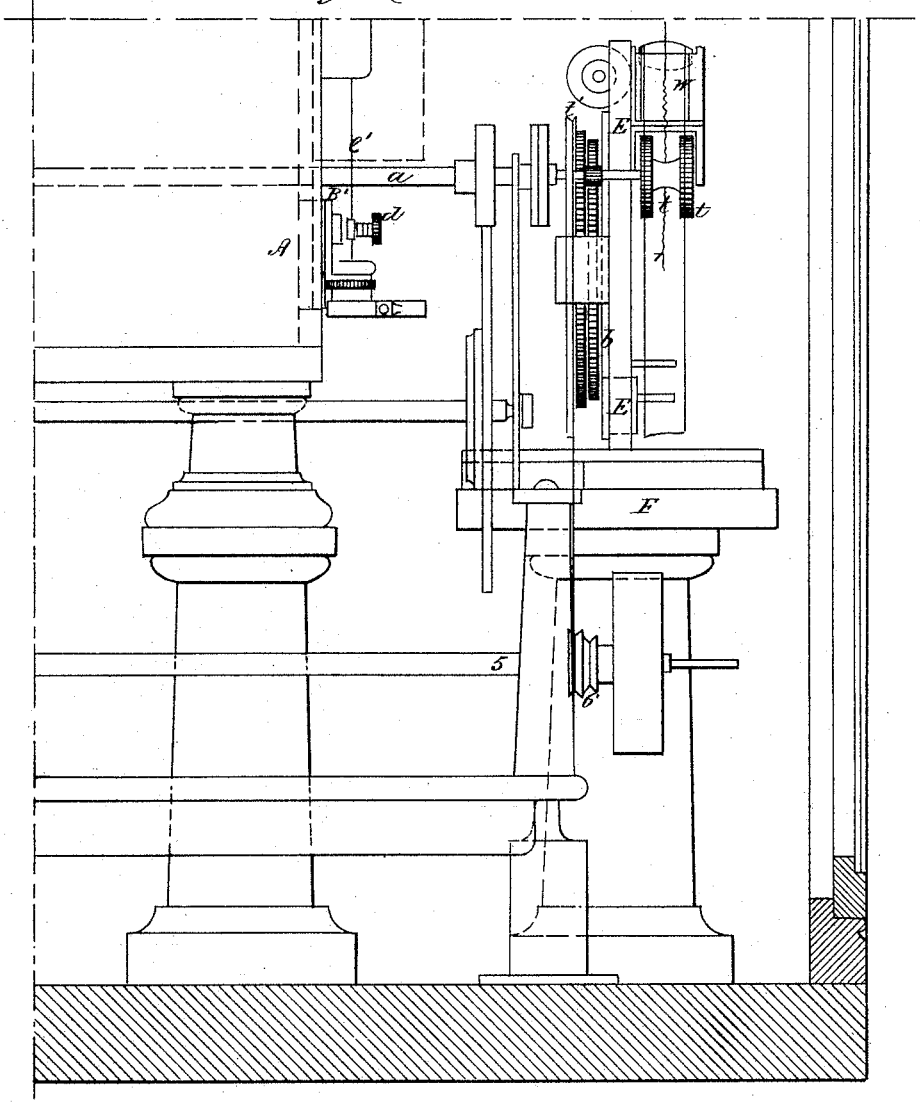

W. THOMSON.
Electric-Telegraph Apparatus.
No. 156,897. Patented Nov. 17, 1874.
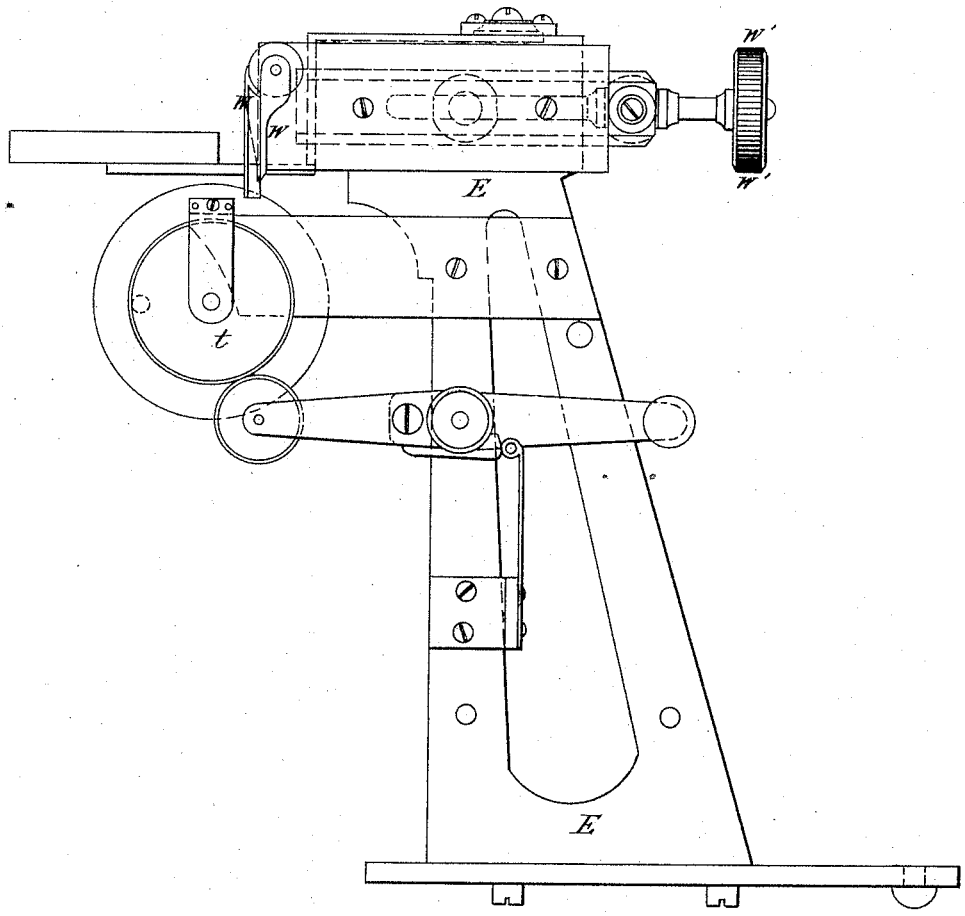
Fig. 1 (Sheet 3)

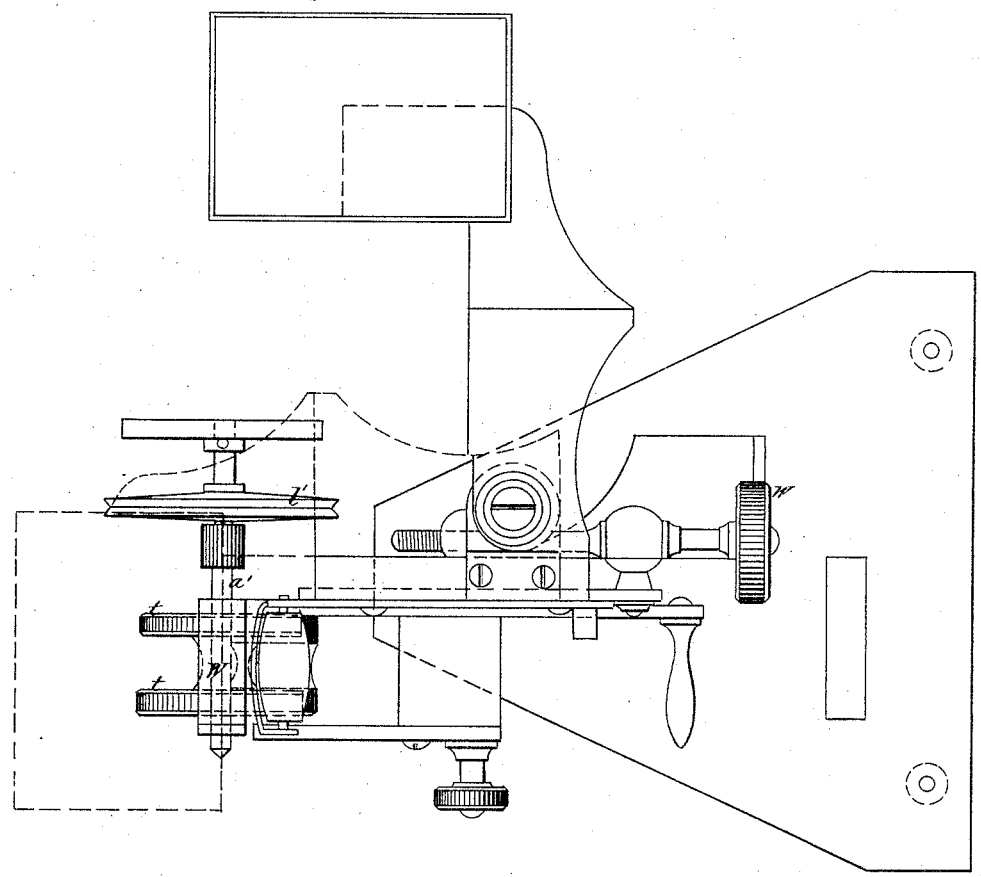

Figure 3:
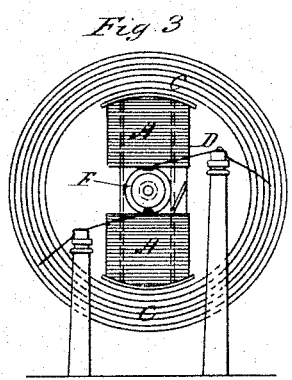

W. THOMSON.
Electric-Telegraph Apparatus.
No. 156,897.
22 Sheets--Sheet 16.
Patented Nov. 17, 1874.
Fig. 3 (Sheet 3)
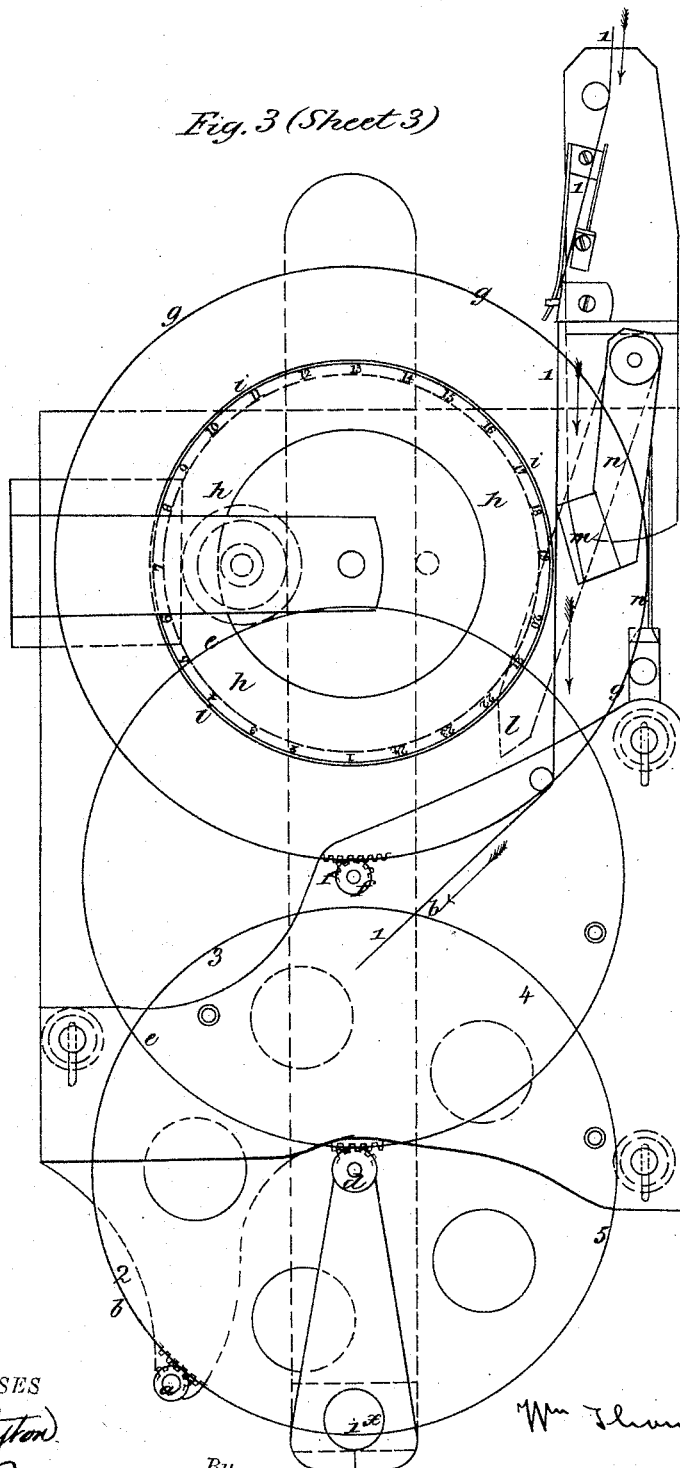

Figure 4:
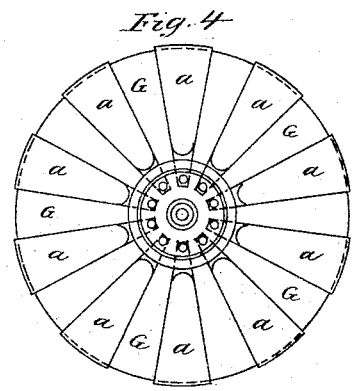

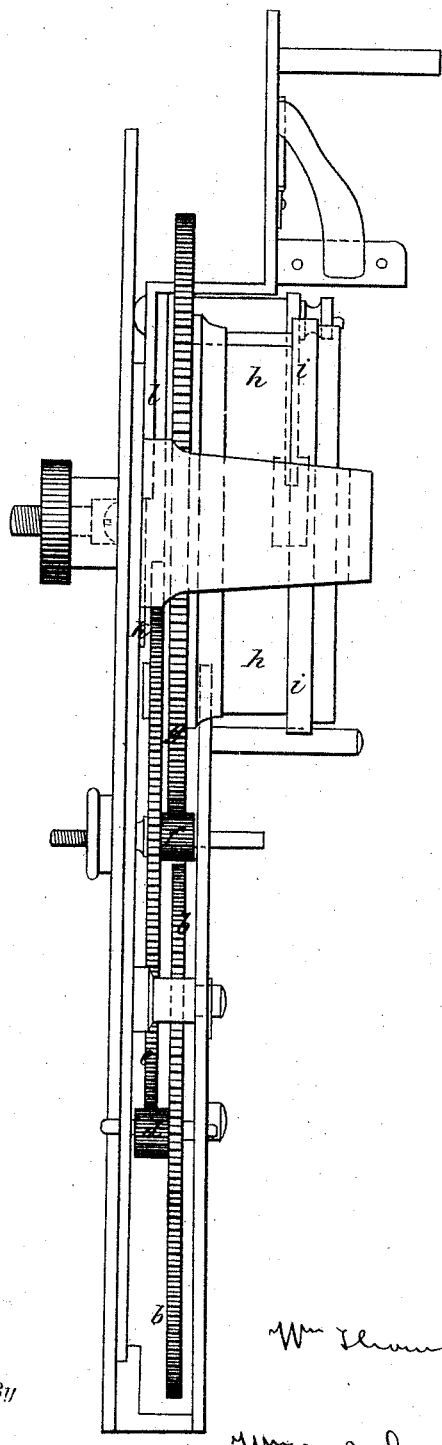
Fig. 4 (Sheet 3)

22 Sheets--Sheet 18.
W. THOMSON.
Electric-Telegraph Apparatus.
No. 156,897. Patented Nov. 17, 1874.
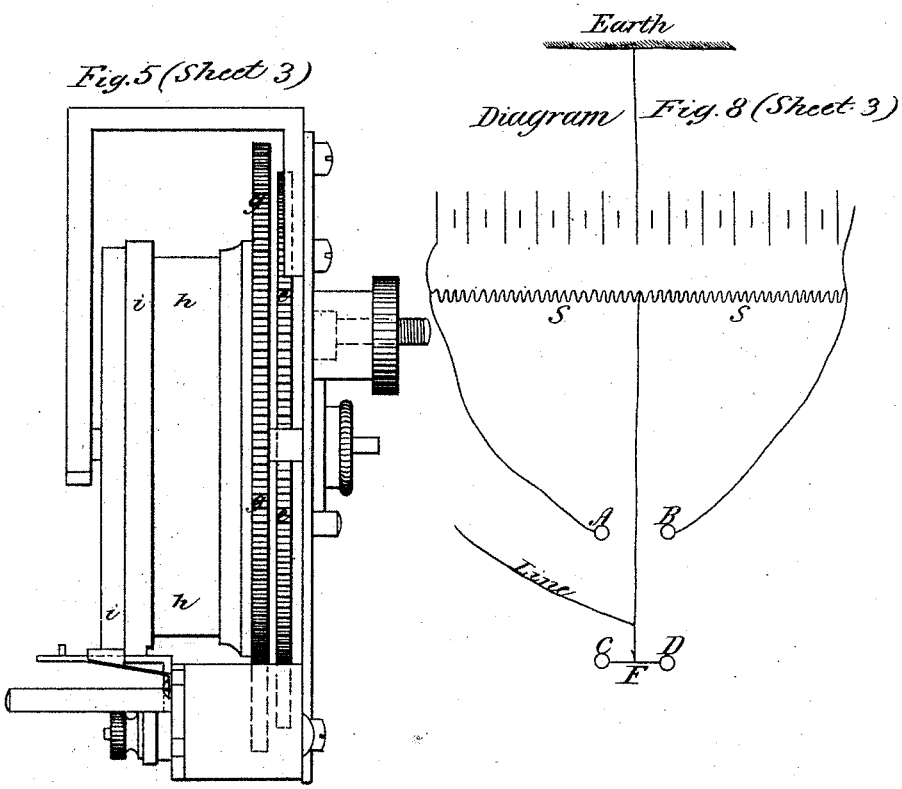
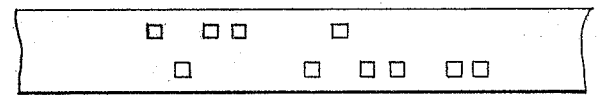
WITNESSES
INVENTOR 22 Sheets--Sheet 19.
W. THOMSON.
Electric-Telegraph Apparatus.
No. 156,897.  Patented Nov. 17, 1874.
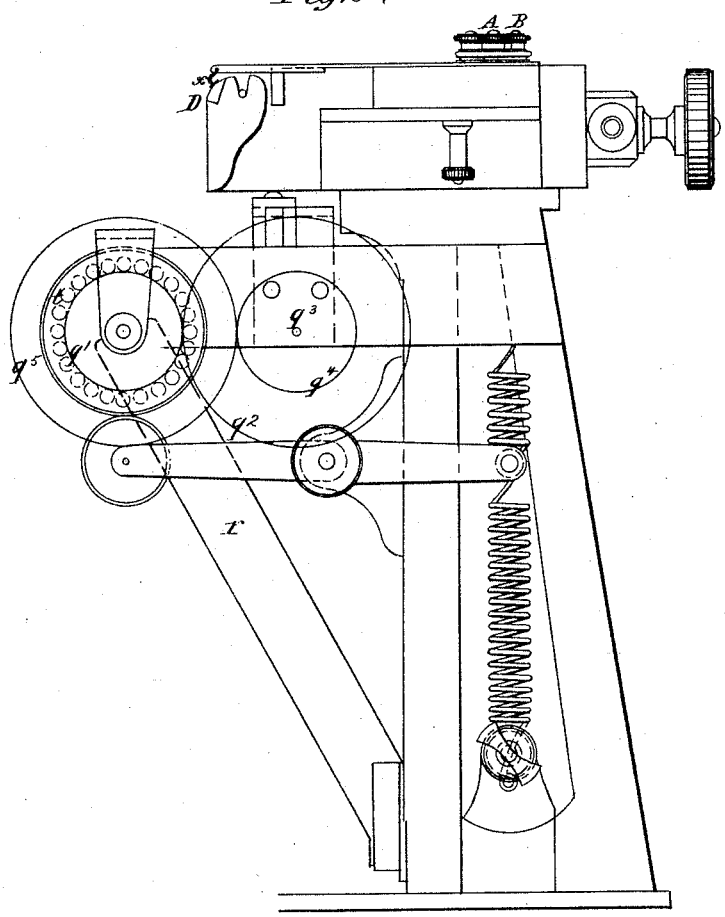
Fig. 6 (Sheet 3)
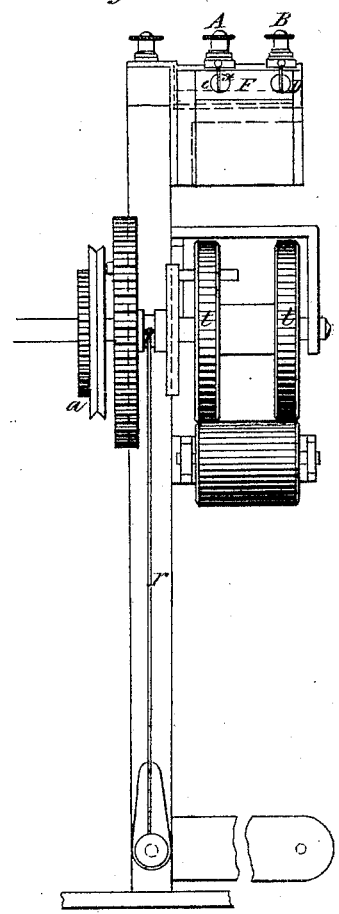
Fig. 7 (Sheet 3)
WITNESSES
Wm J. Peyton
Jos. S. Peyton
INVENTOR
Wm Thomson
By Wm D. Baldwin, his Attorney W. THOMSON.
Electric-Telegraph Apparatus.
No. 156,897. Patented Nov. 17, 1874.
Sheet: 4
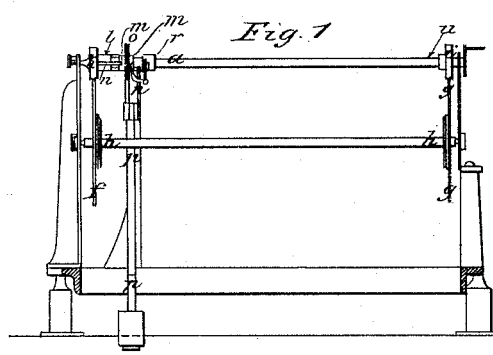
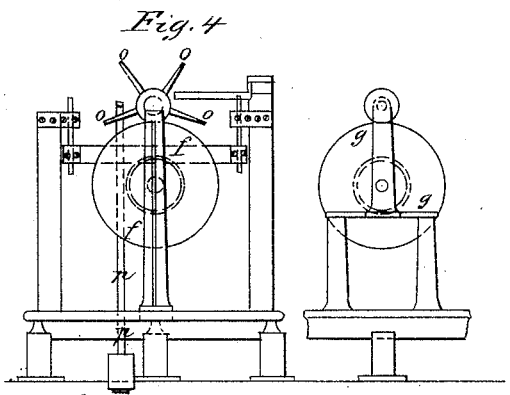
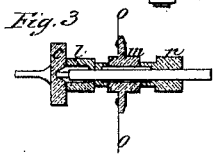
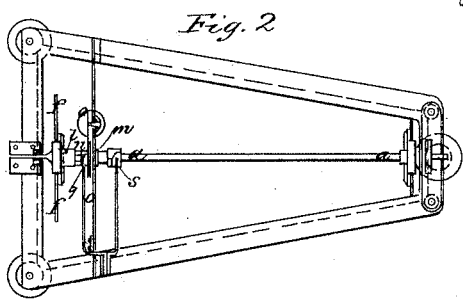
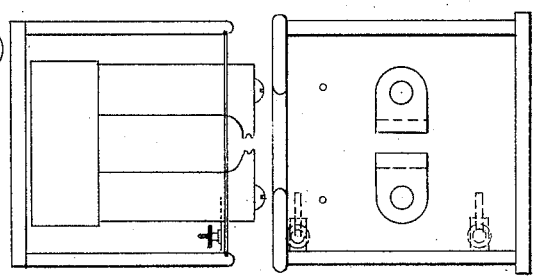

22 Sheets--Sheet 21.

W. THOMSON.
Electric-Telegraph Apparatus.

No. 156,897. Patented Nov. 17, 1874.

Sheet: 5

WITNESSES

INVENTOR

W. THOMSON.
Electric-Telegraph Apparatus.

No. 156,897. Patented Nov. 17, 1874.

Sheet: 7

UNITED STATES PATENT OFFICE.

WILLIAM THOMSON, OF GLASGOW, GREAT BRITAIN.

IMPROVEMENT IN ELECTRIC-TELEGRAPH APPARATUS.

Specification forming part of Letters Patent No. 156,897, dated November 17, 1874; application filed January 6, 1872.

*To all whom it may concern:*

Be it known that I, Sir WILLIAM THOMSON, Knight, of Glasgow College, Doctor of Laws, and Professor of Natural Philosophy in the University and College of Glasgow, in the Kingdom of Great Britain, a subject of the Queen of Great Britain, have invented or discovered new and useful Improvements in Transmitting, Receiving, and Recording Instruments for Electric Telegraphs; and I, the said Sir WILLIAM THOMSON, do hereby declare the nature of the said invention, and in what manner the same is to be performed, to be particularly described and ascertained in and by the following statement thereof—that is to say:

My said invention consists in improvements of and adjuncts to my siphon-recorder, whereby it can be used both as a sending and receiving instrument, and is also made more sensitive and effective, more easily adjusted, and more regularly supplied with sparks. The instrument is rendered more sensitive by having each side of the suspended or signal coil in a magnetic field.

Figure 1:
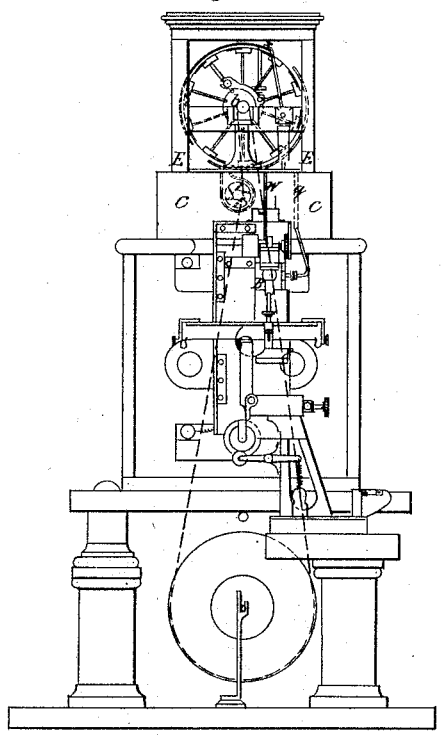
Figure 2:
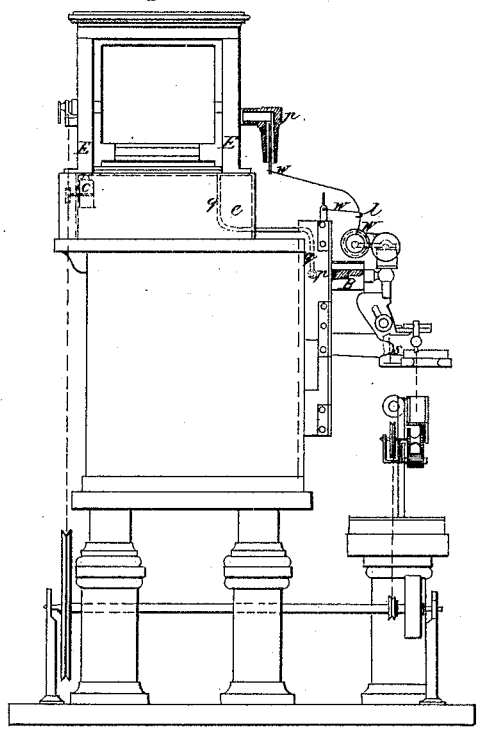
Figure 1:
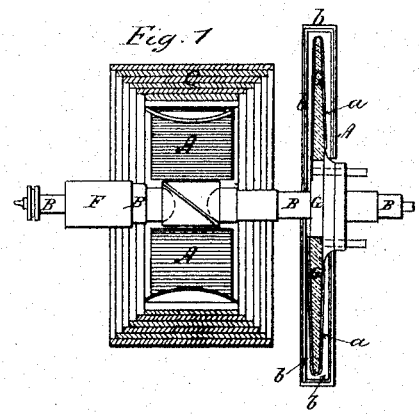
Figure 2:
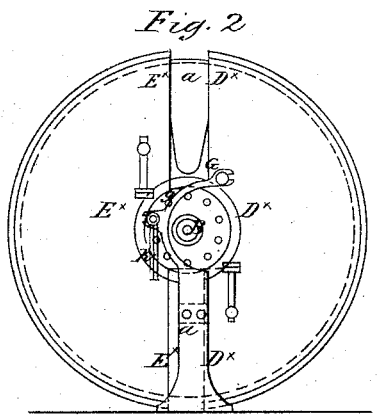

Figure 1, Sheet 1, shows a front elevation of the suspended coil $a\ a\ a\ a$ with a fixed iron core, $b\ b$, inside it. Fig. 2, Sheet 1, shows a side elevation of the same coil $a\ a$ and soft-iron core $b\ b$. Fig. 1, Sheet 2, shows a front elevation of the same coil and core similarly lettered in their position between the poles $c\ c'$ of a powerful electro-magnet. Fig. 2, Sheet 2, shows a side elevation of the case A A containing the large magnet, only one pole, $c$, of which is visible in this view.

The coil $a\ a\ a\ a$ is made in the form of a long rectangle, and is supported at $c\ c$, so that it is movable about the middle line parallel to the long sides. The space between the iron core and the magnet is as narrow as is consistent with freedom of oscillation for the coil.

By this arrangement I obtain the following advantages: The force with which the coil is deflected by any given current in this arrangement is increased, because by it the short portions only of the coil at the top and bottom are not effectively influenced by the electro-magnetic force. The length of the top and bottom portions of the coil can by the said arrangement be greatly reduced, and so the mass and moment of inertia of the signal-coil are much diminished.

The instrument is rendered more effective and is more easily adjusted by the application of graduated shunts to the signal-coil, to regulate what I designate the damping. This is an effect due to induction between the moving coil and the magnet, and its effect is to diminish or wholly prevent injurious oscillation in the signal-coil. One method of producing this effect heretofore adopted consists in applying a shunt to the receiving-coil. I now provide a set of shunt-coils of graduated resistances with a convenient arrangement, whether by a plug or slide, for applying the desired degree of shunt to the movable coil. By this means the exact amount of damping suitable to each speed of signal can be obtained. This system of graduated shunts is also convenient for assisting in the adjustment of the sensibility of the instrument. These shunts are, for the sake of simplicity, not shown in the drawing. They may be placed inside the case A A, and are to be in electrical connection with the terminal screws $d\ d'$, shown at Figs. 1 and 2, Sheets 1 and 2. The received current enters by one of these screws, $d$, and after flowing through the signal-coil $a\ a$ goes out by the other screw, $d'$. A portion of the received current is necessarily diverted through the shunt.

Another method of obtaining the required damping is to construct the signal-coil wholly or in part of bare wire, the effect being wholly or partially to short-circuit the signal-coil by contact between successive layers. The advantage gained by this plan is extreme lightness of coil.

The signal-coil, with its soft-iron core and suspension, is attached to a removable plate, easily taken out and replaced. This removable plate is shown detached from the instrument at Figs. 1 and 2 of Sheet 1, being lettered B B. In Figs. 1 and 2, Sheet 2, it is shown in its place. This removable plate B B, together with the soft-iron core $b$, suspended coil $a$, connecting-fiber $s$, and suspended siphon $m$, may be kept ready in duplicate to replace almost instantly that which has been in use, in case of any accident, such as the clogging of a siphon.

The adjustment of the signal-coil is improved by using the torsional elasticity of stretched wires to give it directing force. These wires $e$ and $e'$ are shown in Figs. 1 and 2, Sheet 1. The upper one can be shortened or lengthened by turning the drum $f$ and slipping the little brass piece on which it is mounted up or down the slide $f'$, from which it is insulated by the piece of vulcanite $f''$. The lower wire might have a similar adjustment, but I prefer to leave the shortening and lengthening to be done at one end only, and to attach the lower end to a spring, $g$, the effect of which is to limit the stress on the stretched wire, and keep it constant.

The directive power is given by the torsional elasticity of the wires $e \, e'$. The undeflected position of the signal-coil is adjusted by turning the drum $h$ on its axis. This twists the wires $e \, e'$, and turns the coil to right or left, as may be desired. Three small adjusting-screws, $h' \, h'$, are provided, by which the wire $e$ may be made truly central with the pivot $g'$, Fig. 3, Sheet 1, and a second set of three screws, $h''$, is provided, by which the pivot $g'$ can be made truly central relatively to the fixed iron core $b \, b$. With these adjustments, the space between $b \, b$ and $c \, c$ can be made much smaller than would be possible without them. The wires $e \, e'$ also serve as electrodes or terminal wires to the signal-coil, and are connected, by suitable helices $l \, l$, with the insulated terminals $d \, d'$. I improve the suspension and adjustment of the siphon by carrying it in a similar manner—that is to say, upon a wire stretched in torsion. The long leg of the siphon is lettered $m$, and its short end $n$ dips into the reservoir D. The siphon is carried by a little saddle, $n'$, which supports the horizontal limb thereof, and is attached to the stretched wire $o \, o^1$, held tight by springs $o^2$, which can be turned round, thereby twisting the wire by the torsion-heads $p \, p'$. The brass frame $q \, q^1$ is capable of adjustment by turning on the axis $r$, which is at the same time a pinching-screw.

The whole system $q \, q^1$, siphon $m \, m'$, and stretched wire $o \, o^1$, can be moved in or out relatively to the plate B B by slipping it between the nut $r$ and the support $r'$, but firmly held by the screw $r$ and nut when the adjustment is complete. The fiber joining the siphon and signal-coil is lettered $s$, Fig. 2, Sheet 1.

The instrument is adjusted as follows: Lengthen or shorten the wires $e \, e'$ to give the required rapidity of oscillation; make the wire $e$ central with the point $g'$; make the point $g'$ central with the iron core $b \, b$; turn the torsion-head $h$ in such a direction as would tighten the fiber $s$; turn the torsion-heads $p \, p'$ in such a direction as will tighten the fiber $s$; also move out the frame $q$ so much as will tighten $s$ sufficiently to bring back the siphon to a mean vertical position, and the coil $a \, a$ to the central position shown in the drawing. If the fiber $s$ brings the siphon back to the vertical before bringing the coil $a \, a \, a \, a$ to its central position, undo a little of the twist given by the torsion-head $h$, and vice versa. I sometimes use a fine glass tube instead of a siphon, fixing the upper end to the ink-bottle, and making the tube of such a shape that its marking-arm can spring, by torsional elasticity or otherwise, so as to follow the oscillations of the signal-coil with sufficient freedom. In this case, I keep that member of the fine tube next the ink-bottle stretched in a straight line by the tension of a stout fiber connected to it and extending from the point where the tube is bent at right angles to form the marking-arm. This arrangement is shown in side elevation at Fig. 4, Sheet 1, and in front elevation at Fig. 5, Sheet 1, where A represents the ink-bottle; B, the fine glass tube, of which $b$ is the marking-point; $c$ the portion which springs by torsional elasticity, and $d$ the stout fiber coupling the tube to the arm $e$.

The tube may be fitted to the ink-vessel by a tube of thin sheet india-rubber, or similar material, or the tube may, as shown in the drawing, be rigidly cemented into the ink-bottle, its own flexibility giving sufficient mobility to the outer end.

The fiber connecting the marking-arm with the signal-coil may, as is shown at Fig. $5^\times$, be prolonged, and provided with a very light spring of sufficient resilience for the purpose of keeping the connecting-fiber tight during all its motions.

I sometimes give stiffness to the siphon or tube by stays.

If, in any case, the mobility in the plane of the paper is found too free with a round tube, greater rigidity can be given by making the tube of oval section, or other arrangements of a stretched fiber, acting as a stay or stays, as shown at Figs. 11, 12, and 13, may be used.

Another method of arranging the marker is shown at Fig. $13^\times$. $a$ is a fine marking-arm, cemented into a somewhat coarser horizontal branch projecting from a glass siphon, $b$. This siphon is supported so as to be capable of turning round its long vertical leg. The mode of support is by two stretched wires or fibers pulling in opposite directions. The axis of motion is in this plan vertical. The fine marking-arm is about as fine as a fine sewing-needle. The coarser arm and siphon is of glass tube, just wide enough to let the fine arm slip in.

The fine marking-arm may be pulled out in case of choking, and another slipped in and cemented with wax at any moment.

While giving greater effective rigidity in the plane perpendicular to the paper, it will give either unchanged mobility, or less mobility, or greater mobility of the tube parallel to the paper, according as its fixed end is in a certain line perpendicular to the length of the tube, or nearer the outer end, or farther from the outer end. When the single stay is used its fixed end is adjusted to give the desired mobility to the outer end of the tube, and the proper tightness of the stay.

This improvement allows the plane of the arc, along which the marking end of the tube moves in virtue of the signals, to be horizontal instead of vertical, as it necessarily is with the siphon, if of simplest form, and smallest amount of inertia attainable; and it also allows, when desired, the signals to be first shown on the portion of the paper where it is running horizontally.

This improvement further allows ink or other fluid to be forced through the tube by hydrostatic pressure, to clean the tube or to mark paper for signals independently of sparks. In many cases—for instance, in rapid signaling with powerful currents through land-lines—the requisite pressure for good marking, whether with or without electrification of the siphon, may be that due to from one to three or four inches head of the liquid.

In all such cases this pressure is most conveniently obtained by having free communication of air pressure between the atmosphere and the free surface of ink in the ink-vessel— that is to say, by having the ink-vessel either open or closed by a cover not perfectly airtight. When a greater constant pressure is desired that can be easily thus obtained. I produce the requisite pressure either by gravity acting on a column of mercury, or by air or other fluid pressing on the free surface of the ink, or by a piston or by a flexible part of the ink-bottle acted on by force properly applied from without. The column of mercury is preferable in respect of constancy. I also apply hydrostatic pressure to free the tube from obstructions. If the tube becomes clogged at any time, so as to impair the marking, the obstruction is often removable by fluid pressure forcing the ink to flow through it. This cannot be done easily for the siphon otherwise than by the operator's sucking the lower end of it by his mouth—a delicate operation, involving the probability of breaking the siphon. With the fixed tube various methods can be adopted, by which it may be cleared with much greater force with perfect safety to the tube, and without any dexterity on the part of the operator.

One of these is as follows: I apply an air-syringe of small bore to the upper part of the ink-bottle, which, if ordinarily open to the air, is to be closed for the occasion by a proper plug or stop-cock. Any degree of air pressure required is then readily applied to the free surface of the ink.

Another method is by a reservoir of mercury connected by a flexible tube to one branch of a U-tube, the upper portion of the other branch of which is in hydrostatic communication with the ink-vessel either through the liquid itself, continued to the surface of the mercury, or through a portion of air intervening. A much greater pressure than can be obtained by blowing with the mouth can be easily provided by raising the reservoir of mercury at any time through the spaces of a few inches or feet.

The mercury-reservoir may be left ordinarily in such a position as to give the proper pressure for regular marking, but at any time, in case of suspected clogging, for instance, it may be instantly raised or lowered, so as to produce a largely-increased or largely-diminished pressure.

When mere pressure on the ink will not remove obstructions I force down nitric acid or suck it up from the bottom of the tube from a vessel provided with this object. This is most easily done by applying (with the aid of the apparatus above described) nitric acid to the marking-end of the tube and drawing a very small quantity of that fluid through the tube either by a syringe acting as a drawing air-pump, or by a mercury-vessel lowered several inches below the level of the tube.

I put a counterpoise to the siphon, preferably attached on the aluminium-carrier on the side remote from the marking-arm of the siphon, to diminish irregular vibrations. This counterpoise, which may be of wax, is attached to the carrier $n'$, so that the center of inertia of the siphon $m$ and the carrier with counterpoise may lie on the axis round which the whole turns. This has two advantages: First, diminishing the tendency to irregular vibrations caused by tremors transmitted through the frame-work, whether from the moving gear or from disturbances in the neighborhood, such as are experienced when the instrument is used in a crowded city, in a factory, or at sea; second, checking the disturbance of signals caused by the motions of the ship when the instrument is used at sea.

I conduct away ink flowing from the siphon when not in use by an adjustable vessel or reservoir, (not shown in the drawings.) In order to admit of the introduction of this reservoir, and for other purposes, it is necessary that there should exist an arrangement for drawing back the paper from the siphon-point. This arrangement is shown in Fig. 1, Sheet 2. The paper follows the line 1 1 1 1, being drawn only by the roller $t$ driven by suitable gear from the prime mover, namely, an electro-magnetic engine, hereinafter described. Just before reaching this roller $t$ the paper passes over the shield $w$, and this shield can be drawn back or pushed forward by the screw and thread $w'$, which, on being turned, causes the shield $w$ to slide backward or forward. This mechanism is shown in enlarged detached views at Figs. 1 and 2, Sheet 3. The paper can also be adjusted laterally by moving the whole bracket E E outward and inward on the frame F. This gives an adjustment in a plane at right angles to that in which the head $w'$ causes the paper to move.

I also provide against the accumulation of large drops of ink at the end of the siphon or tube, when no signals are being recorded, by keeping the paper moving at a slow speed. I drive the drawing-off roller as follows: A small V-pulley, 3, Figs. 1 and 2, Sheet 2, is placed on the shaft of a prime mover, 2. A belt passing round 3 drives the large pulley 4 on the shaft 5. A belt from a small pulley, 6, on the shaft 5, drives the pulley $t'$ on the shaft of the paper-roller $t$, or, instead of this arrangement, I prefer to use that shown at Figs. 6 and 7, Sheet 3, wherein the paper-roller $t$ is driven by means of a clutch, $q$, and this allows the paper to be moved at a slower rate than obtains with the mechanism previously described. The clutch $q$ admits of being thrown back so as to release the shaft on which the roller $t$ is fixed by means of a lever, $r$, Figs. 6 and 7, Sheet 3, and then becomes engaged with a toothed pinion, $q^1$, which drives a spur-wheel, $q^2$, on a secondary shaft, $q^3$, a pinion, $q^4$, on which again drives a spur-wheel, $q^5$, on the shaft of $t$, which is then driven at a much slower speed. I prefer to let the shaft 5 be entirely supported by two belts, having only lateral guides to keep it in its place. This arrangement diminishes friction, and prevents the transmission of mechanical vibrations from the prime mover to the paper.

The paper and statical induction apparatus are driven by an electro-magnetic engine of improved construction. (Shown at Figs. 6 and 7, Sheet 1.) This engine consists of a series of bars of soft iron, $a\ a\ a$, arranged like the staves of a barrel, but separated from one another by insulating material, and successively attracted by the electro-magnet A. The make-and-break apparatus, by which the electro-magnet is caused to attract the successive bars or armatures $a\ a\ a$ at the proper time, is shown in detail at Figs. 8, 9, and 10, Sheet 1, and its position in relation to the electro-magnetic engine is shown at Figs. 6 and 7 thereof. The circuit of the electro-magnet is complete when contact is made between the platinum knob $c$ attached to the spring $d$ and the platinized contact-piece $e$, which are at other times insulated from one another by the vulcanite piece $f$. The movable contact-piece is a short piece of stout platinum wire, $c$, soldered near one end of an approximately-straight steel spring, $d$. This end of the spring is reduced to a round pin, $x$, in line with the middle line of the spring, and projecting to a short distance beyond the platinum contact-piece. The other end of the spring is attached to a fixed insulated piece of metal, $g$, with which it is in metallic communication, and through which it forms part of the circuit, which is completed when the movable contact-piece $c$ is allowed to press on the fixed contact-piece $e$ by the projecting pin $x$ being let down by the cam A. The line of the spring is parallel to the axis of the electro-magnetic engine, and its plane of motion passes through this axis. The cam lifts the projecting pin $x$ to break contact, and leaves it free at the proper times to make contact by its own elastic force. The spring $d$, which is approximately straight, either when making contact or when lifted through the small space of the cam's action on it, is under considerable elastic strain. When dismounted and allowed to take its unstrained shape it is curved. In this state the curvature ought, if the flexual rigidity of the spring is uniform throughout, to be approximately in simple proportion to length along the curve from the end, which is fixed when the spring is in position. This condition is easily fulfilled with sufficient approximation to accuracy by giving the spring a proper set, so that when mounted it is found to be nearly enough straight, and to press with sufficient force against the fixed contact-piece, to secure good contacts. This disposition is such that the motion of the spring is in a plane perpendicular to that of the cam, the form of the spring approximately straight, and the point of pressure of the cam very close to the movable contact-piece. A screw, $w$, is used to lift or lower the spring $d$, and thus adjust the length of contacts. The time when contact is made is adjusted by turning round the cam A on the axis, and fixing it in the required position by set-screws $i$ and $j$. The bearings of the electro-magnetic engine should be constructed so as to cause very little friction, and I attain this end by supporting the pivots of the main shaft $b\ b$, Fig. 6, Sheet 1, on rollers $d\ d$. Each pivot is prevented from slipping off the roller by two smooth parallel guides, between which it plays easily. Motion of the shaft in the direction of its axis is checked by two hard plates, $x'$, fixed perpendicular to its axis at a distance asunder slightly greater than its length. The anti-friction rollers $d\ d$, each of one piece of steel, are of the shape shown in the drawings. They are kept in position by end plates similar to those hereinbefore described for the main shaft $b\ b$. Each of the rollers $d\ d$ dips into an oil-vessel, and carries oil round sufficiently to keep its own pivots and the pivots of the main shaft constantly oiled.

The guiding-cheeks of the main shaft and the bearings of the anti-friction rollers are so placed that, during the action of the instrument, the pivots of the main shaft press each of them only on one of these guides and on the anti-friction roller, but with much more force on the anti-friction roller than on the guide. It need press with no more force on the guide than to prevent it from leaving that guide and moving over to the other under the influence of the varying force to which it is subjected through the successive electro-magnetic attractions. I regulate the speed of revolution by adding or subtracting resistance from the circuit of the electro-magnet; and I sometimes diminish the spark at the contact-piece $e$ by using a permanent shunt, connecting the ends of the electro-magnet's coil.

The induction apparatus is constructed so that the replenisher is alone used and the electrophorous heretofore employed is dispensed with. I use the armatures of my engine disposed as staves of a barrel, $a\ a\ a$, Figs. 6 and 7, Sheet 1, as part of the carriers of the induction apparatus, the other part being a series of brass strips, $f\ f\ f$, Figs. 6 and 7, attached to the soft-iron staves.

The action of the replenisher is as follows: E, Figs. 6 and 7, is a plate in connection with the earth. B is an insulated plate, from which the electricity of high potential is taken to the siphon. Four springs, $g\ h\ i\ k$, the last being shown by a dotted line only, are arranged so as to make the contacts hereinafter described. The carriers $a\ a\ a\ a$ are moving in the direction of the arrow $1^0$.

When a carrier $a$ first comes under the cover of the insulated plate B, which is, say, positively electrified, it is electrically connected with the plate B by the spring $g$ making contact with the metal bar $a'$, attached to $a$. Any positive electricity on $a$ then flies to B $2^0$. When the same carrier $a$ has moved farther, so as to be completely covered by the plate B, the contact with the spring $g$ is broken, and a little later a fresh contact made with the spring $h$, and a diametrically-opposite carrier $a$ is, by the spring $k$, at the same time, joined to the carrier $a$ first referred to, and, being covered by the earth-plate E, the said carrier $a$ becomes by induction positively electrified, while the opposite carrier is negatively electrified, $3^0$. After the two contacts with $h$ and $k$ have been broken the carrier $a$, now negatively charged, is put into connection with the earth, and discharged by the spring $i$ $4^0$. The same carrier is, in its turn, positively charged by the spring $k$.

In place of the electro-magnetic engine hereinbefore described I sometimes employ as my prime mover a magnetic engine of the arrangement illustrated at Sheet 7 of the accompanying drawings, whereon Fig. 1 is a section, partly in elevation, thereof; Fig. 2, an elevation of that end marked A, Fig. 1; Fig. 3, an elevation of that end marked B, Fig. 1, while Fig. 4 is a detached view of the vulcanite disk G, showing the arrangement of the carriers $a$ situated thereon. This engine consists of one bar or of a series of bars of soft iron compactly packed together, situated in the interior of and extending the full length of the cylindrical casing A, which is attached to the engine-shaft B, as shown at Figs. 1 and 2. The casing A is so situated in the interior of a powerful cylindrical compound magnet, C, that as the engine revolves the opposite ends of the soft-iron bars contained in the casing A are alternately brought under the influence of the opposite poles of the said magnet C.

The make-and-break apparatus, by which the magnet is caused to attract the opposite ends of the soft-iron bars alternately, is more particularly shown at Figs. 1 and 3.

The movable contact-pieces by which the current is alternately made and broken consist of a series of springs arranged in two sets, D and E. Each of these sets is arranged after the manner of the teeth of a comb, and is made to bear upon the periphery of the drum F, which is situated upon the engine-shaft B, as shown. At two points in the periphery of the drum F, diametrically opposite to each other, and in the plane of the soft-iron bar, strips of agate or other insulating material are inserted, as shown, which, when brought round by the revolutions of the drum F, so as to be in contact with the springs D and E, thereby break the metallic connection, and therewith the attractive influence of the magnet upon the end of the soft-iron bar is reversed.

The induction apparatus is constructed and arranged in the following manner: Upon a vulcanite disk, G, the carriers $a\ a$ are arranged as shown at Figs. 1 and 4. The disk G and carriers $a\ a$ are partially inclosed by a metallic casing, but which is insulated from the carriers $a\ a$ by means of a thin vulcanite lining, $b$, as more particularly shown at Fig. 1.

The metallic casing is constructed in two parts, as shown at Fig. 2, one side of which, namely, that marked $E^\times$, is in connection with the earth, while that marked $D^\times$ is completely insulated, and from which the electricity to the siphon is conducted, the manner whereby the electricity is drawn from the earth-plate E, and discharged onto the insulated plate B, being in every respect similar to that employed for the same purpose with the electro-magnetic engine hereinbefore described, namely, through the medium of the springs $g$, $h$, $i$, and $k$, as arranged and shown at Fig. 2. I use a dry pile, contained in the vulcanite-chamber X, Figs. 1 and 2, Sheet 1, and Figs. 1 and 2, Sheet 2, to initiate the electrification of the inductor B. I connect the electrified inductor B with the siphon by a metallic conductor, W, Figs. 1 and 2, Sheet 2, and a semi-insulating thread, $v$. The conductor W leading from the inductor B rests upon the shaft $u'$, upon which the drum Y is carried.

When the conductor W becomes overcharged with the current, a portion of it may be drawn off by placing the wooden arm W' in contact with or very close to the little wooden stud $l$, attached to the under side of the conductor, and thus a portion of the current is diverted, the remainer or non-diverted portion passing on constantly by a semi-insulating thread, $v$, which can be lengthened or shortened to oppose more or less resistance to the passage of electricity. The mode of attaching, lengthening, or shortening this thread $v$ is shown in Figs. 1 and 2, Sheet 1, and at Figs. 1 and 2, Sheet 2.

The one end of the thread is attached to the metal shaft $u$ bearing a vulcanite cylinder, F, having a deep screw cut on it. The other end of this thread $v$ is attached to a small metal drum, Y, acted on by a spring like that on ordinary pocket measuring-tape. By turning the vulcanite drum the thread is wound upon it, and pulled out from the metal drum so as to augment the resistance, as in Wheatstone's rheostat. When the vulcanite drum is turned in the other direction, the spring draws the string round the metal drum, and the resistance is diminished. If the smallest resistance thus obtained, when the two drums are conveniently placed, is found to be too small, the part of the thread remaining unwound between the vulcanite drum and the metal shaft of the vulcanite drum may be impregnated with salt, or even replaced by a fine metallic wire. A second thread may similarly be used between the plate B and earth, to draw off an excess of electricity. The speed of the engine, as has been stated above, is regulated by shunts and added resistance. The shunts, where chronometric accuracy is desired, are thrown off and on by a differential motion regulated by a pendulum. Instead of shunts, added resistance might obviously be treated in the same manner. The mode by which the shunts are thrown off and on is shown in Figs. 1 and 2, Sheet 4. The shaft $a$ is called the chronometer-shaft. It rests on two anti-friction rollers, $f$ and $g$, attached to one long shaft, $h$, which may be supported on ordinary bearings below it. It bears upon these rollers by two other rollers, $i$ and $k$, coaxial with itself.

The roller $i$ is rigidly attached to the chronometer-shaft. The other roller, $k$, is attached to a tube, $l$, mounted on this shaft $a$, by means of a collar at one end of the tube, and a bearing at its other end for one terminal pivot of the chronometer-shaft $a$. The four rollers $f$, $g$, $i$, and $k$ are of such dimensions as to give the tube $l$ such a differential motion that it goes round somewhat faster than the chronometer-shaft. I find that something from five to ten per cent. faster than the chronometer-shaft gives good results. A second-tube, $m$, fitting between two collars on the chronometer-shaft, is placed close to the tube $l$, and is carried round by two spring-clips, $n$, pressing it externally, or other suitable friction-gear may be employed. This second-tube $m$, when unchecked, is carried round as if rigidly connected with the first tube; but it can be checked with ease, so as to be altogether stopped at any time. When it is released the friction is sufficient to set it very suddenly in motion again with the same speed as the first tube. The second tube $m$ carries one or more arms, $o$ $o$ $o$, which act upon a pendulum, $p$, through a pallet or pallets, after the manner of the teeth of a dead-beat escapement-wheel, as shown at Fig. 4, Sheet 4. They keep the pendulum $p$ vibrating, and at each impact on the dead-face of the pallet the rotation of the tube is checked sufficiently to prevent more than one arm from passing for every period of the pendulum. Thus, if a "half-seconds" pendulum be used—that is to say, a pendulum whose period is one second—and if the second-tube $m$ is to turn once round in six seconds, there must be six arms; or, if it turns once round in five seconds, there must be five arms, as shown in the drawing.

These arms might be rigid, like the teeth of an ordinary escapement-wheel, so that the arrangement would simply be an escapement-wheel, loose on the chronometer-shaft, and influencing it in the manner described below; but I prefer making the arms elastic to prevent damage in case of any of them being taken aback by the pallet, and also to regulate the motive force applied to the pendulum by each arm in escaping the pallet.

There may be either two pallets, arranged just like those of the ordinary anchor of the dead-beat escapement, or there may be only one pallet, one side of the anchor, as it were, being cut away. When only one pallet is used, the plane of motion of the arm may very conveniently be perpendicular to the plane of motion of the pendulum, which gives an arrangement preferable, in point of simplicity, to other more common or obvious transformations of the general plan described above.

Another fixed spring, $s$, is similarly kept in communication with a metal ring, $r$, rigidly attached to the chronometer-shaft $a$. The rim of this ring is composed partly of metal and partly of insulating material, as seen in Figs. 1 and 2, Sheet 4, and is touched by the spring $t$, Fig. 1, Sheet 4, carried by the escapement wheel or tube $m$. By insulating materials properly placed these two springs $s$ and $t$ are cut off from metallic communication through the moving parts, which have been described, except when the spring $t$, carried by the escapement-wheel, is in contact with the metallic part of the rim on which it presses.

One or other of the springs $s$ and $t$ may be in metallic communication with the chronometer-shaft and the two tubes $l$ and $m$, but I prefer insulating all the pieces of metal which are in connection with either of the fixed wires by vulcanite or other proper material, so as to prevent metallic communication between them and the shaft and tubes. The two springs $s$ and $t$ are connected to the two ends of the coil of the driving electro-magnet A, Figs. 6 and 7, Sheet 1, by electrodes of proper resistance, to fulfill the following condition: When the second tube $m$ is in such a position relatively to the main shaft $a$ as to make contact, the coil of the electro-magnet is shunted, so as to reduce the driving-power sufficiently for the purpose of regulation. For example, if the resistance in the electrodes and movable contact-pieces, which have been described, is infinitely small, the driving-power would be altogether stopped when the contact referred to is made; but this would be a more abrupt controlling action than is desirable. In most cases I prefer to arrange so that the resistance in the shunt shall be several times greater than the resistance in the electro-magnet; and I secure that the controlling action shall be sufficient by adjusting the rate approximately by the method above described. All that is necessary to secure this condition is that, without the regulating-shunt the chronometer-shaft would attain a speed greater than the proper speed, but that when the shunt is applied the power is insufficient to maintain the proper speed.

In connection with my instrument I sometimes employ a chronometer, for the purpose of indicating the time at which a message is being transmitted or recorded. The position which the said chronometer occupies in relation to the other parts of the instrument is shown on the general-arrangement drawings, Figs. 1 and 2, Sheet 2, while its constructive features are more particularly illustrated at Figs. 3, 4, and 5, Sheet 3, which are, respectively, a side elevation, plan, and end elevation thereof.

Under the arrangement shown, a pinion, $a'$, fixed upon the spindle of the paper-roller $t$, is placed in gear with the first wheel $b$ of the chronometer-train, the number of teeth in the wheel and pinion being such that, with the rate at which the pinion $a'$ is driven, the wheel $b$ is caused to make a complete revolution in exactly five minutes. In accordance wherewith its flat face is divided into five equal spaces, numerically marked, as shown at Fig. 3, Sheet 3. Coaxial with the wheel $b$ a pinion, $d$, is fixed, which is geared into a wheel, $e$, the number of teeth in the pinion $d$ being, to the number of teeth in the wheel $e$, on the ratio of one to twelve. The wheel $e$ thus makes a complete revolution in one hour. In like manner a pinion, $f$, upon the same axis as the wheel $e$, is geared into another wheel, $g$; and the ratio of the number of teeth in their respective circumferences being as one to twenty-four, the wheel $g$ makes a complete revolution in twenty-four hours.

Upon the flat face of the wheel $g$ a drum, $h$, is fixed concentric therewith, the outer surface of which is divided into hour-units, and numerically marked in succession, as shown at Fig. 3, Sheet 3. Its outer rim $i$ is correspondingly divided, and at each division has a type or types situate thereat, indicating numerically the successive hours. As the strip of paper, 1, upon which a message is to be recorded, or which may be employed as the medium of transmission, according as the instrument is employed for either sending or receiving signals, is drawn along in contact with the lower surface of the drum $h$ in the direction indicated by the line 1, and by the arrows at Fig. 3, each hour in succession is stamped thereon, that being effected by means of a stud, $k$, attached to the wheel $e$, being at a point in each successive hourly revolution brought into contact with and depressing a lever, $l$. Immediately that the stud $k$ has passed out of contact with the lever $l$ a hammer, $m$, fixed upon the extremity of a lever, $n$, is forced upward by means of the resistance of a spring, $n'$, so as to strike the paper 1 against the periphery $i$ of the drum $h$, whereby it receives an impression from the type or types situated thereon, the said impression recording numerically the hour of the operation, and each successive hour is similarly recorded, minutes being read off at $x$ upon the wheel $b$.

The new instrument sends as well as receives messages. The same motive power and gearing may be used to draw forward punched paper for signaling, and I sometimes use the same strips of paper to send and receive messages, alternative lengths of the paper being punched and plain. The electrical connections are so arranged that the signals sent by the paper are recorded on the same paper. The paper used to send is punched into two or more rows of holes, as hereinafter set forth, and contact made through the holes by dead pressure between two metallic surfaces, C and D, and springs $x$ and $y$, as shown at Figs. 6, 7, and 8, Sheet 3. These contacts may be made a little behind the siphon, or elsewhere. A suitable switch is provided for altering the connections from sending to receiving. The same instrument, with the signal-coil sufficiently shunted, records the sent signals. I prefer a simple stout bar, F, Figs. 7 and 8, Sheet 3, pressed against contacts, as my switch. I give positive and negative signals by two constant springs, $x$ and $y$, only. To do this I keep the two poles of the battery constantly connected with one another through a wire, S, Fig. 8, Sheet 3, of sufficient resistance, the middle of this wire being connected with the line, as shown, and the middle of the battery with earth.

The diagram, Fig. 8, Sheet 3, shows the proper arrangement of connections for sending and receiving, as above described. The diagram, Fig. 9, Sheet 3, shows the punched paper. The part of the instrument by which the paper is punched contains the following peculiarities: The paper, which is drawn on by a drum after each perforation, begins to move gradually, and after attaining a maximum of speed, comes gradually to rest. The power employed to make the perforations and to start the paper may first start a fly-wheel loose on a revolving shaft, but tending to draw it on by friction. I also draw back any slack in the paper behind the drum by a spring or weight. The part of the instrument by which the paper is punched is constructed to suit the Steinheil system with perforations in two rows. The same plan with obvious enough changes of detail is applicable to perforate the paper for other modes of signaling which may be desired. In any case I use three levers which, according to usage, will often be called keys. One of them I call the space-key, another the dot-key, and another the dash-key, the recent submarine usage having applied the name of dots and dashes in submarine signaling to left-and-right motions of the marker.

The dot-key makes its perforations in the proper line of the dots; the dash-key in that of the dashes. The punches may be rigidly attached to the keys, or they may move in slides pressed down to cut the paper by the key, and returning by springs. I prefer to connect each punch rigidly with its key. The paper is at rest for the whole time during which the lowest part of any of the punches is below the upper surface of the paper, it being supposed that the punches move downward in cutting. As, however, a detailed description and drawings of the said paper-punching mechanism were deemed objectionable upon the examination of my application, they are not given.

In lieu of arranging the instrument in all respects as hereinbefore described, I prefer to dispense with the glass case in which it is inclosed, and sometimes not to use chronometric contact, and to adopt the general arrangement illustrated at Sheet 5 of the drawings. In this arrangement an air-turbine, driven from a pulley on the revolving shaft $b\,b$ of the electro-magnetic engine, is used to drive a current of dried air through the casing E containing the electro-magnetic engine, as well as through the tubular casing B which surrounds the insulating-stem bearing the ink-bottle and its connections. The turbine is by preference placed in one side of the casing C, which contains the driving electro-magnet, and the current of air drawn in by its revolution is discharged up through the floor of the casing E, and in part out through perforations $o$ in the shield $p$ of the conductor W, as shown, and in part by a pipe, $q$, leading to the tubular casing B. The air driven through the apparatus may be dried by passing it over sulphuric acid, or other means for depriving air of moisture may be adopted. The result of this application of the turbine is both to prevent dust or shreds from settling on the stems, and to keep them dry. The same tubular arrangement allows air to be occasionally forced through by bellows or a hand-fanner, so as to blow away from the case and stems dust which may have accumulated.

Having now described the nature of my said invention and the manner in which the same is or may be used or practically carried into effect, I would observe in conclusion that what I consider novel and original, and therefore claim as the invention, is—

1. The combination and arrangement, substantially as before set forth, of the electro-magnet, the suspended signal-coil, and the fixed soft-iron core for said coil.

2. The combination, substantially as before set forth, of the suspended signal-coil, the suspended siphon or marking-tube, and the connecting-fiber, with a removable plate or stock, so that the said coil and marking-tube can be readily removed and replaced by others adjusted for use.

3. The combination, substantially as before set forth, of the signal-coil with the stretched wires communicated with the insulated terminals, the drum to shorten or lengthen the said wires, and a torsion-head to turn the same on their axes, so that the signal-coil may be adjusted by the torsional elasticity of the stretched wires, which also act as electrodes.

4. The combination, substantially as before set forth, of the marking-tube, the stretched wire that carries it, and the torsion-head for turning the said wire.

5. The combination, substantially as before set forth, of the ink-reservoir, the marking-tube, and the suspended signal-coil, so that, while the said marking-tube is fixed to the ink-reservoir, the outer end of said tube is free to be moved in consonance with the oscillations of the signal-coil.

6. The combination, substantially as before set forth, of the ink-reservoir and the device for applying a varying pressure to the surface of the liquid in said reservoir, so that said liquid may be drawn or forced through said tube, as desired.

7. The combination, substantially as before set forth, of the working-arm of the marking-tube with a stay for stiffening it.

8. The combination, substantially as before set forth, of the marking-tube with a counterpoise to diminish vibrations.

9. The method, as before set forth, of preventing an accumulation of ink at the point of the marking-tube when signals are not being received, by traversing the paper slowly past the said point at such times.

10. The combination, substantially as before set forth, of the plate connected with the earth, the insulated plate, the contact-springs, the revolving carriers, and the siphon or marking-tube.

11. The combination, substantially as before set forth, of the motor and the paper-drawing gear by hanging pulleys, so as to diminish vibrations.

12. The combination, substantially as before set forth, of the paper-drawing rollers with a pendulum, so as to control the speed of the former.

13. The combination and arrangement, substantially as before set forth, of the paper-moving mechanism, the chronometer-mechanism, and the types of the latter, so that the time is recorded upon the signal-receiving paper.

14. The combination, substantially as before set forth, of the electrified conductor with the siphon or marking-tube by an adjustable inductor of very high resistance, whereby any excess of electricity may be drained off.

15. The combination, substantially as before set forth, of the suspended signal-coil, the magnet, the inductor, and a dry pile to initiate the electrification of the inductor.

16. The arrangement, in the same machine, of a single motor with the suspended signal-coil, the siphon or marking-tube, the mechanism for moving the receiving-paper, and the mechanism for moving the punched paper, so that the same motive power which produces the electric sparks is employed to move forward the receiving-paper and the punched paper for sending signals.

17. The relative arrangement, substantially as before set forth, of the suspended signal-coil, the siphon or marking-tube, the signal-transmitting mechanism, and the paper-moving mechanism, so that the same strip of paper may be employed both to receive and to transmit the signals.

18. The relative arrangement, substantially as before set forth, of the suspended signal-coil, the siphon or marking-tube, the signal-transmitting mechanism, the paper-moving mechanism, and the switch and shunt, so that the same paper may be employed to record both signals transmitted and signals received.

19. The combination and arrangement, substantially as before set forth, of the suspended signal-coil, the siphon or marking-tube, the inductor, the two constant springs for giving positive and negative signals, and the switch, so that, in a machine producing marks by the operation of a suspended coil, positive and negative signals may be given by two contact-springs only.

WILLIAM THOMSON.

Witnesses:
   JOHN DUNCAN,
      45 *West George Street, Glasgow,*
        *Clerk at Law.*
   DUNCAN McINTYRE,
      45 *West George Street, Glasgow,*
        *Clerk at Law.*